(12) United States Patent
Baudu et al.

(10) Patent No.: US 12,503,022 B2
(45) Date of Patent: Dec. 23, 2025

(54) DATA PROCESSING METHOD AND ASSEMBLY OF A SEAT AND A CONTROLLER

(71) Applicant: FAURECIA Sièges d'Automobile, Nanterre (FR)

(72) Inventors: Samuel Baudu, Boulogne Billancourt (FR); Mamadou Balde, Morigny-Champigny (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 360 days.

(21) Appl. No.: 17/955,694

(22) Filed: Sep. 29, 2022

(65) Prior Publication Data

US 2023/0102383 A1    Mar. 30, 2023

(51) Int. Cl.
| | | |
|---|---|---|
| *B60N 2/56* | (2006.01) | |
| *B60N 2/00* | (2006.01) | |
| *G01R 27/26* | (2006.01) | |
| *G01V 3/08* | (2006.01) | |

(52) U.S. Cl.
CPC ......... *B60N 2/5678* (2013.01); *B60N 2/0031* (2023.08); *G01R 27/2605* (2013.01); *G01V 3/088* (2013.01); *B60N 2210/12* (2023.08)

(58) Field of Classification Search
CPC ... B60N 2/5678; G01R 27/2605; G01V 3/088
USPC .......................................................... 701/29
See application file for complete search history.

(56) References Cited

U.S. PATENT DOCUMENTS

| | | | |
|---|---|---|---|
| 2019/0226879 A1 | 7/2019 | Lakatos | |
| 2020/0317098 A1* | 10/2020 | Li | G05D 23/1904 |
| 2021/0206230 A1 | 7/2021 | Ishikawa | |
| 2023/0064831 A1* | 3/2023 | Gwengo | C09D 11/033 |

FOREIGN PATENT DOCUMENTS

| | | | |
|---|---|---|---|
| EP | 2572943 B1 | | 9/2015 |
| JP | 2020185130 A | * | 11/2020 |
| WO | 2012038325 A1 | | 3/2012 |
| WO | 2019147800 A3 | | 9/2019 |
| WO | 2021155370 A1 | | 8/2021 |

OTHER PUBLICATIONS

French Search Report for French App. No. FR2110331 dated May 31, 2022, 9 pages, No English Translation Available.

* cited by examiner

*Primary Examiner* — Adam D Tissot
(74) *Attorney, Agent, or Firm* — Barnes & Thornburg LLP

(57) ABSTRACT

The present disclosure relates to a method for processing capacitance values generated by capacitive sensors with interdigitated electrodes supported by a seat of a vehicle.

16 Claims, 2 Drawing Sheets

DATA PROCESSING METHOD AND ASSEMBLY OF A SEAT AND A CONTROLLER

PRIORITY CLAIM

Figure 1:
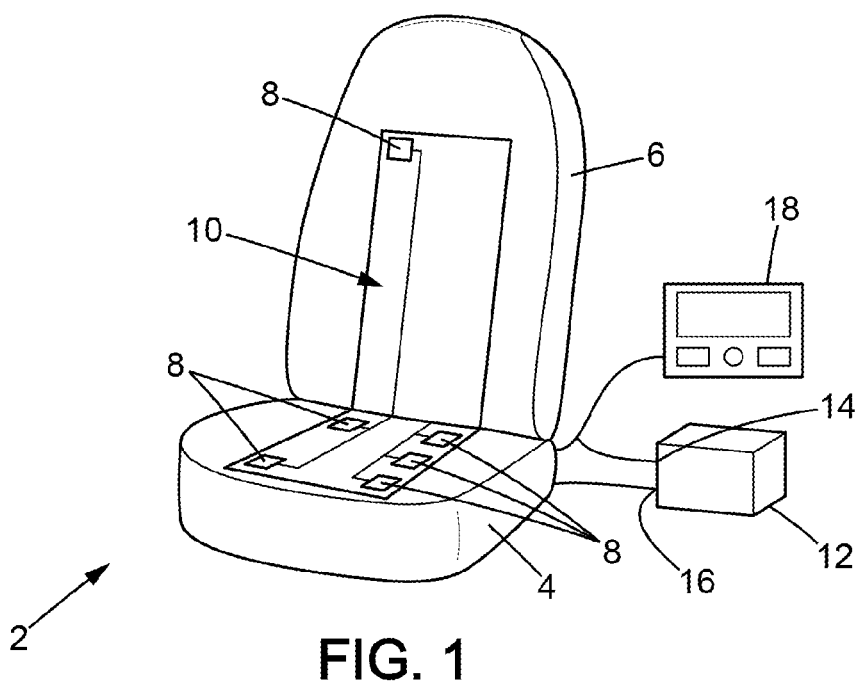

This application claims priority to French Patent Application FR 2110331, filed Sep. 30, 2021, which is expressly incorporated by reference herein.

BACKGROUND

The present disclosure relates to vehicle seats. In particular, the present disclosure relates to a method for processing capacitance values generated by capacitive sensors with interdigitated electrodes mounted on a seat and an assembly comprising a seat and a controller suitable for implementing the processing method.

SUMMARY

According to the present disclosure, a method for processing capacitance values generated by capacitive sensors with interdigitated electrodes supported by a seat of a vehicle, in particular a motor vehicle; the seat being equipped with a heating system, the method being implemented by a controller adapted to receive capacitance values measured by the capacitive sensors with interdigitated electrodes at regular time intervals throughout the duration of the method; the controller being adapted to receive a warning signal indicating an operating or non-operating state of the heating system; the method comprising the following steps:
  detecting the presence of an occupant on the seat from the received capacitance values;
  receiving a warning signal indicating an operating state of the heating system,
  upon receipt of the warning signal, implementing an initial phase in which adaptive compensation is applied to each received capacitance value, the adaptive compensation having a value that increases over time during the initial phase;
  implementing a continuation phase after a defined time from receipt of the warning signal, wherein a continuation compensation is applied to each received capacitance value, the continuation compensation having a constant value during the continuation phase, the continuation phase being implemented as long as the heating system is in an operating state and as long as the occupant is seated in the seat.

The features described in the following paragraphs may be implemented as an option. They may be implemented independently of each other or in combination with each other. The initial phase comprises at least a first period and a second period subsequent to the first period, the increase in adaptive compensation in the first period being greater than the increase in adaptive compensation in the second period.

Applying adaptive compensation to each received capacitance value comprises an addition of the adaptive compensation.

The first period comprises a plurality of sub-periods subsequent to each other, and wherein the adaptive compensation value added to the capacitance values in a subsequent sub-period is increased by a first defined quantity relative to the adaptive compensation value added to the capacitance values measured in a current sub-period.

The first defined quantity is between 100 picofarads and 300 picofarads, and is preferably equal to 200 picofarads.

The sub-periods of the first period have a duration of between 2 minutes and 3 minutes, and preferably a duration equal to 2 minutes.

The defined time T is between 6 minutes and 13 minutes and preferably is equal to 10 minutes.

The second period P2 comprises several sub-periods subsequent to each other, and in which during the second period, the adaptive compensation value added to the capacitance values received during a subsequent sub-period is increased by a second quantity defined with respect to the adaptive compensation value added to the capacitance values received during a current sub-period.

The second defined quantity is between 50 picofarads and 150 picofarads, and is preferably equal to 100 picofarads.

The sub-periods of the second period have a duration of between 2 minutes and 3 minutes, and preferably a duration equal to 2 minutes.

Applying a continuation compensation to each received capacitance value comprises adding a continuation compensation.

The added continuation compensation has a value between 1000 picofarads and 3000 picofarads.

The step of detecting the presence of an occupant on the seat comprises a step of detecting a decrease greater than 10,000 picofarads between successive capacitance values.

The method further comprises a prior learning step during which the adaptive compensation values and the continuation compensation value are adjusted with respect to the seat and to the heating system of the seat.

The present disclosure also relates to an assembly of a vehicle seat and a controller, the seat comprising capacitive sensors with interdigitated electrodes, a heating system, the controller comprising a first input capable of receiving a warning signal indicating an operating or non-operating state of the heating system, and a second input connected to the capacitive sensors with interdigitated electrodes, the controller being capable of implementing the processing method mentioned above.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
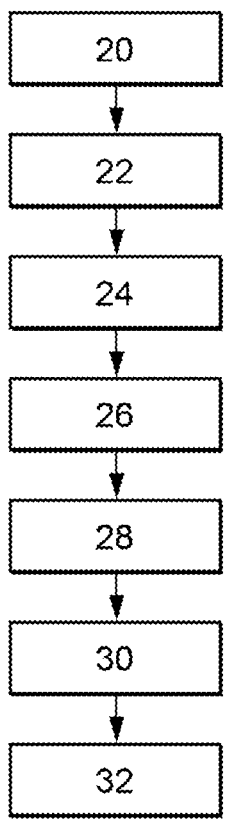
Figure 3:
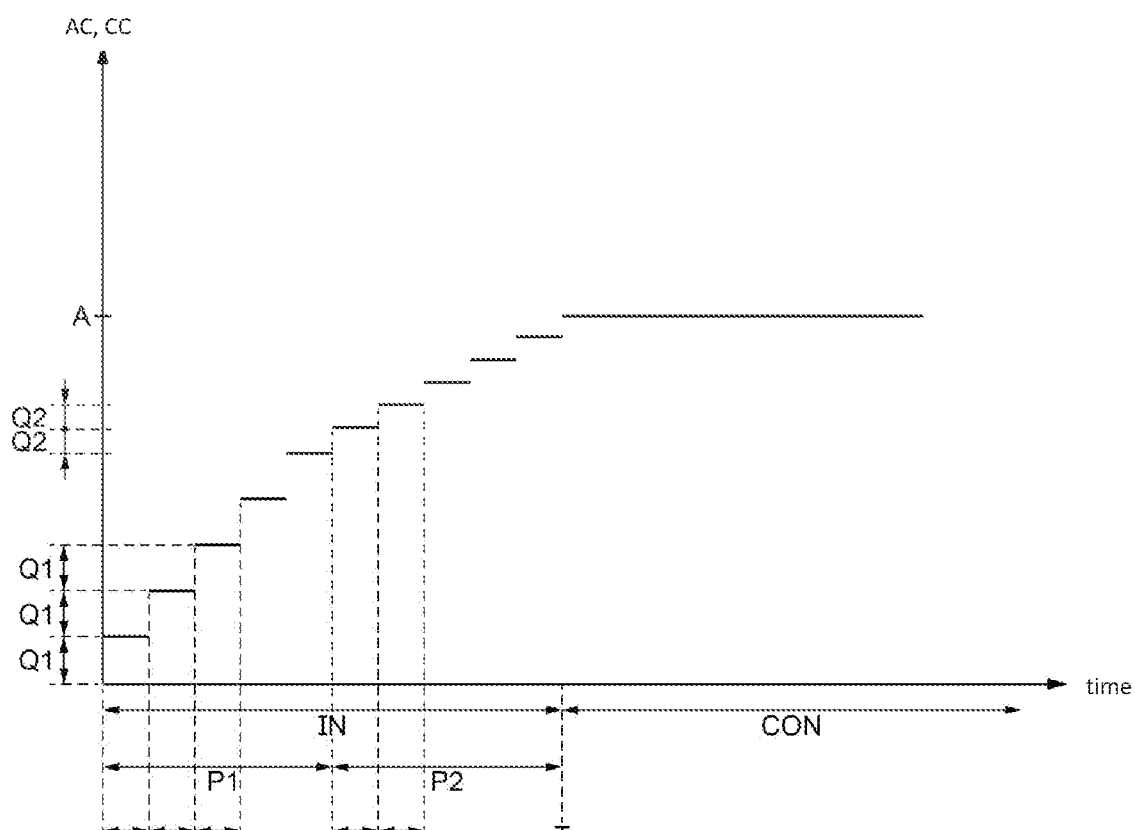

The detailed description particularly refers to the accompanying figures in which:
  FIG. 1 is a perspective view of a seat according to the present disclosure;
  FIG. 2 is a flowchart representing the steps of the processing method according to the present disclosure; and
  FIG. 3 is a diagram representing the compensations added to the capacitance values as a function of time.

DETAILED DESCRIPTION

The present disclosure relates to a method for processing capacitive values generated by capacitive sensors with interdigitated electrodes according to the present disclosure. This method may for example be used in a method exploiting the capacitance values measured by the capacitance sensors with interdigitated electrodes such as, for example, in a method for detecting a rotation of a part of the trunk of an occupant seated on a seat of vehicle.

The processing method is implemented by an assembly 1 comprising a vehicle seat 2 and a controller 12. The vehicle is for example a motor vehicle, a train, or a boat. FIG. 1 shows an example of an assembly 1 according to the present disclosure. In this example, the seat 2 comprises a seat pan 4, a backrest 6 hinged to the seat pan, capacitive sensors with coplanar interdigitated electrodes 8 mounted on the seat, and a heating system 10 mounted on the seat.

The capacitive sensors with interdigitated electrodes 8 are suitable for measuring capacitance values at regular time intervals. For example, capacitance values are measured every 50 to 500 milliseconds, and preferably every 100 milliseconds. The capacitive sensors with interdigitated electrodes 8 are electrically connected to the second input 16 of the controller. The measured capacitance values are transmitted to the controller. In the embodiment shown in FIG. 1, five capacitive sensors with interdigitated electrodes 8 are mounted on the seat pan, and one capacitive sensor with interdigitated electrodes is mounted on the backrest.

The heating system 10 is for example comprised of a heating sheet resting on the seat pan and possibly the backrest. As a variant, the heating system 10 is comprised of a pulsating, heated air ventilation system.

In the embodiment shown in FIG. 1, the assembly 1 further comprises a control panel 18 for controlling the operation of the heating system. The control panel 18 is connected to the heating system 10 and the controller 12. It comprises in particular a control button for starting or stopping the heating system 10. The control panel 18 is capable of generating a warning signal indicating an operating state of the heating system when a user commands the heating system to start via the control button. The control panel 18 is also capable of generating a warning signal indicating a non-operating state of the heating system or, in other words, of stopping the heating system, when a user commands the heating system to stop via the control button.

The controller 12 comprises a first input 14 capable of receiving a warning signal indicating an operating or non-operating state of the heating system, and a second input 16 capable of receiving capacitance values measured by the capacitive sensors with interdigitated electrodes 8, and the controller 12 comprises a central processing unit, such as a processor or a microprocessor, the first 14 and the second 16 inputs, a memory unit, and an executable code making it possible to implement the processing method described hereinafter. The controller may be a programmable device that uses software, a specific integrated circuit (ASIC) or part of an engine control unit (ECU).

Referring to FIG. 2, the processing method according to the present disclosure begins with a preliminary learning step 20 during which the value of a first quantity Q1, the value of a second quantity Q2, and a continuation compensation value CC are adjusted according to the type of seat and the type of heating system. In fact, these values may vary slightly depending on the quality of the foam mounted on the seat, the type of seat covering, and the heating speed of the heating system. This learning step is performed only once for a given type of seat, namely for a given combination of a type of foam, a type of covering, and a type of heating system.

The duration of the sub-periods, the duration of the first period P1, the duration of the second period P2, and the duration of the defined time T may also be adjusted.

This learning step consists in carrying out capacitance measurements as a function of the temperature of the seat and in comparing these measurements with pre-established values.

During a step 22, the controller 12 detects the presence of an occupant on the seat from the capacitance values received. In particular, the controller detects a decrease greater than 10,000 picofarads between capacitance values received by all of the capacitance sensors with interdigitated electrodes 8. For this purpose, five to twenty successively received capacitance values are analyzed in a sliding analysis window. Preferably, about ten successively received capacitance values are analyzed in a sliding analysis window.

When the control button for starting the seat heating system is pressed, a warning signal indicating the operating state of the heating system is transmitted from the control panel to the heating system 10 and to the controller 12. This operation warning signal indicates that the heating system has been started.

During a step 24, the controller receives the warning signal indicating the operating state of the heating system. On receipt of this warning signal, an initial phase IN begins. The initial phase is divided into a first period P1 and a second period P2 subsequent to the first period. The first period P1 is subdivided into sub-periods referenced as SP1 to SP5. The second period P2 is subdivided into sub-periods referenced as SP6 to SP10.

During each sub-period of the first period P1, the controller applies adaptive compensation AC to each received capacitance value.

This application comprises adding adaptive compensation AC. In particular, this application is an addition of adaptive compensation AC.

This addition is carried out during a step referenced as 26. This adaptive compensation AC is added to each capacitance value coming from each interdigitated capacitance sensor.

The adaptive compensation AC has a value which increases over time during the first period P1.

The adaptive compensation value AC added during the first sub-period SP1 of the first period is equal to the first value. In the embodiment shown in FIG. 3, the first value is equal to the first defined quantity Q1.

The adaptive compensation value AC added to the capacitance values received during the second sub-period SP2 is increased by the first defined quantity Q1 with respect to the adaptive compensation value AC added to the capacitance values received during the sub-period SP1. Thus, in the example represented in FIG. 3, the adaptive compensation value AC added to the capacitance values received during the second sub-period SP2 is equal to twice the first defined quantity Q1.

Similarly, the adaptive compensation value AC added to the capacitance values received during the third sub-period SP3 is equal to three times the first defined quantity Q1.

The first defined quantity Q1 is between 100 picofarads and 300 picofarads, and is preferably equal to 200 picofarads.

The sub-periods of the first period P1 have a duration of between 1 minute and 3 minutes, and preferably a duration equal to 2 minutes.

In the embodiment shown, the first period P1 lasts between 10 and 15 minutes.

Similarly, during each sub-period of the second period P2, the controller applies adaptive compensation AC to each capacitance value received. This application comprises an addition. In particular, this application is an addition. This addition is carried out during a step referenced as 28.

The adaptive compensation AC added during the second period also has a value that increases over time.

The adaptive compensation value AC added during the first sub-period SP6 of the second period is equal to the adaptive compensation value AC added during the last sub-period SP5 of the first period plus a second defined quantity Q2.

Then, the adaptive compensation value AC added during the second sub-period SP7 of the second period is equal to the adaptive compensation value AC added during the first sub-period SP6 of the second period plus a second defined quantity Q2.

In general, during the second period P2, the adaptive compensation value AC added to the capacitance values received during a following sub-period SP7 is increased by the second quantity defined with respect to the adaptive compensation value AC added to the capacitance values received during a current sub-period SP6.

The second defined quantity Q2 is less than the first defined quantity Q1. The increase in adaptive compensation AC achieved during the second period P2 is less than the increase in adaptive compensation AC achieved during the first period P1.

The second defined quantity Q2 is between 50 picofarads and 150 picofarads, and is preferably equal to 100 picofarads.

The sub-periods SP6 to SP10 of the second period have a duration of between 2 minutes and 3 minutes, and preferably a duration equal to 2 minutes.

The initial phase lasts a defined time T. After this defined time T, which begins at the time of receipt of the warning signal, the controller enters a continuation phase CON. During this continuation phase CON, the controller applies continuation compensation CC to each received capacitance value. Applying continuation compensation CC comprises adding a continuation compensation CC. In particular, this application is an addition of continuation compensation CC.

This addition takes place during a step referenced as 30. The added continuation compensation has a constant value A throughout the continuation phase. The continuation compensation is between 1000 picofarads and 3000 picofarads.

The continuation phase is implemented as long as the heating system is in an operating state and as long as the occupant is seated in the seat.

When the occupant switches off the heating system 10 via the control button, the method continues with a termination phase during which an adaptation compensation is added to each capacitance value received. This addition takes place during a step referenced as 32. This adaptation compensation gradually decreases with each sub-period during the termination phase.

As a variant, applying adaptive compensation AC to each received capacitance value consists of multiplying each received capacitance value by a predefined factor. Similarly, as a variant, the application of a continuation compensation CC to each received capacitance value consists of multiplying each received capacitance value by a predefined factor.

As a variant, the initial phase IN comprises more than two periods. In the embodiment represented and described, the first and the second period have the same duration. However, they may have different durations.

Comparative presence detection sensors mounted on vehicle seats are often disturbed by the use of a heating system. To overcome this drawback, the comparative detection sensors are often supplemented or replaced with complex electronic circuits. However, these more complex electronic systems are not reliable over time. The present disclosure remedies this drawback.

The invention claimed is:

1. A method for processing capacitance values generated by capacitive sensors with interdigitated electrodes supported by a seat of a vehicle, in particular a motor vehicle; the seat being equipped with a heating system, the method being implemented by a controller capable of receiving capacitance values measured by the capacitance sensors with interdigitated electrodes at regular time intervals during the entire duration of the method; the controller being capable of receiving a warning signal indicating an operating or non-operating state of the heating system; the method comprising the following steps:
    detecting the presence of an occupant on the seat from the capacitance values received;
    receiving a warning signal indicating an operating state of the heating system,
    upon receipt of the warning signal, implementing an initial phase during which an adaptive compensation is applied to each capacitance value received, the adaptive compensation having a value which increases over time during the initial phase;
    implementing a continuation phase after a defined time with respect to the receipt of the warning signal, a continuation compensation being applied to each capacitance value received during the continuation phase; the continuation compensation having a constant value during the continuation phase; the continuation phase being implemented as long as the heating system is in an operating state and as long as the occupant is seated on the seat;
    wherein the initial phase comprises at least a first period and a second period subsequent to the first period, the increase in the adaptive compensation during of the first period being greater than the increase in adaptive compensation during the second period;
    and wherein applying adaptive compensation to each received capacitance value comprises an addition of the adaptive compensation; the first period comprising several sub-periods subsequent to each other; the adaptive compensation value added to the capacitance values during a following sub-period being increased by a first defined quantity with respect to the adaptive compensation value added to the capacitance values measured during a current sub-period.

2. The method of claim 1, wherein the first defined quantity is between 100 picofarads and 300 picofarads, and is preferably equal to 200 picofarads.

3. The method of claim 1, wherein the sub-periods of the first period have a duration of between 2 minutes and 3 minutes, and preferably a duration equal to 2 minutes.

4. The method of claim 1, wherein the defined time is between 6 minutes and 13 minutes and preferably is equal to 10 minutes.

5. The method of claim 1, wherein applying a continuation compensation to each received capacitance value comprises adding a continuation compensation.

6. The method of claim 5, wherein the added continuation compensation has a value between 1000 picofarads and 3000 picofarads.

7. The method of claim 1, wherein the step of detecting the presence of an occupant on the seat comprises a step of detecting a decrease greater than 10,000 picofarads between successive capacitance values.

8. The method of claim 1, which further comprises a prior learning step during which the adaptive compensation values and the continuation compensation value are adjusted relative to the seat and to the heating system of the seat.

9. An assembly of a vehicle seat and of a controller, the seat comprising capacitive sensors with interdigitated electrodes, a heating system, the controller comprising a first input suitable for receiving a warning signal indicating an operating or non-operating state of the heating system, and a second input connected to the capacitive sensors with interdigitated electrodes, the controller being capable of implementing the treatment method according to claim 1.

10. A method for processing capacitance values generated by capacitive sensors with interdigitated electrodes supported by a seat of a vehicle, in particular a motor vehicle; the seat being equipped with a heating system, the method being implemented by a controller capable of receiving capacitance values measured by the capacitive sensors with interdigitated electrodes at regular time intervals during the entire duration of the method; the controller being capable of receiving a warning signal indicating an operating or non-operating state of the heating system; the method comprising the following steps:

detecting the presence of an occupant on the seat from the capacitance values received;

receiving a warning signal indicating an operating state of the heating system, upon receipt of the warning signal, implementing an initial phase during which an adaptive compensation is applied to each capacitance value received, the adaptive compensation having a value which increases over time during the initial phase;

implementing a continuation phase after a defined time with respect to the receipt of the warning signal, a continuation compensation being applied to each capacitance value received during the continuation phase; the continuation compensation having a constant value during the continuation phase; the continuation phase being implemented as long as the heating system is in an operating state and as long as the occupant is seated on the seat;

wherein the initial phase comprises at least a first period and a second period subsequent to the first period, the increase in the adaptive compensation during of the first period being greater than the increase in adaptive compensation during the second period;

and wherein applying adaptive compensation to each received capacitance value comprises an addition of the adaptive compensation; the second period comprising several sub-periods subsequent to each other; the adaptive compensation value added to the capacitance values during a following sub-period being increased by a second defined quantity with respect to the adaptive compensation value added to the capacitance values measured during a current sub-period.

11. The method of claim 10, wherein the second defined quantity is between 50 picofarads and 150 picofarads, and is preferably equal to 100 picofarads.

12. The method of claim 10, wherein the sub-periods of the second period have a duration of between 2 minutes and 3 minutes, and preferably a duration equal to 2 minutes.

13. The method of claim 10, wherein applying a continuation compensation to each received capacitance value comprises adding a continuation compensation.

14. The method of claim 13, wherein the added continuation compensation has a value between 1000 picofarads and 3000 picofarads.

15. The method of claim 10, wherein the step of detecting the presence of an occupant on the seat comprises a step of detecting a decrease greater than 10,000 picofarads between successive capacitance values.

16. The method of claim 10, which further comprises a prior learning step during which the adaptive compensation values and the continuation compensation value are adjusted relative to the seat and to the heating system of the seat.

\* \* \* \* \*